US010510162B2

(12) United States Patent
Doganis

(10) Patent No.: US 10,510,162 B2
(45) Date of Patent: Dec. 17, 2019

(54) COMPUTER-IMPLEMENTED METHOD OF CALIBRATING A CAMERA

(71) Applicant: Dassault Systemes, Velizy Villacoublay (FR)

(72) Inventor: Fivos Doganis, Yerres (FR)

(73) Assignee: DASSAULT SYSTEMES, Velizy Villacoublay (FR)

(*) Notice: Subject to any disclaimer, the term of this patent is extended or adjusted under 35 U.S.C. 154(b) by 0 days.

(21) Appl. No.: 15/601,619

(22) Filed: May 22, 2017

(65) Prior Publication Data

US 2017/0372491 A1 Dec. 28, 2017

(30) Foreign Application Priority Data

Jun. 28, 2016 (EP) .................................. 16305777

(51) Int. Cl.
*H04N 5/232* (2006.01)
*G06T 7/80* (2017.01)
(Continued)

(52) U.S. Cl.
CPC ............ *G06T 7/80* (2017.01); *G06K 9/00711* (2013.01); *G06T 7/13* (2017.01); *H04N 5/23222* (2013.01);
(Continued)

(58) Field of Classification Search
CPC ...... H04N 17/00; H04N 17/002; H04N 17/02; H04N 5/222; H04N 5/23222;
(Continued)

(56) References Cited

U.S. PATENT DOCUMENTS 5,850,472 A 12/1998 Alston
6,194,860 B1* 2/2001 Seelinger ................ B25J 5/007
318/586

(Continued)

OTHER PUBLICATIONS

Extended European Search Report from European Application No. 16305777.1, entitled: "A Computer-Implemented Method of Calibrating a Camera," dated: Nov. 23, 2016.

(Continued)

*Primary Examiner* — Michael Lee
(74) *Attorney, Agent, or Firm* — Hamilton, Brook, Smith & Reynolds, P.C.

(57) ABSTRACT

A computer-implemented method of calibrating a camera, comprises the steps of: a. acquiring a video stream from said camera (CAM), and displaying it on a screen (DY); b. displaying on the screen, superimposed to the video stream, a representation of a target area (102); c. detecting a calibration pattern (100) in the video stream and periodically check whether it fits within the calibration area; d. when the calibration pattern is found to fit within the calibration area, extracting an image thereof from the video stream; said steps a. to d. being iterated a plurality of times using respective target areas corresponding to different positions of a physical support (101) carrying the calibration pattern; and then e. estimating intrinsic calibration parameters of the camera by processing said images. A computer program product, computer-readable data-storage medium and computer system for carrying out such a method.

20 Claims, 4 Drawing Sheets

(51) Int. Cl.
    *G06T 7/13*          (2017.01)
    *G06K 9/00*         (2006.01)
    *H04N 5/445*       (2011.01)
    *H04N 17/00*      (2006.01)

(52) U.S. Cl.
    CPC ..... *H04N 5/23293* (2013.01); *H04N 5/44504* (2013.01); *H04N 17/002* (2013.01); *G06T 2207/10016* (2013.01)

(58) Field of Classification Search
    CPC .. H04N 5/23293; H04N 5/44504; G06T 7/80; G06T 7/81; G06T 7/82; G06T 7/83; G06T 7/84; G06T 7/85; G06T 7/13; G06T 2207/10016; G06T 2207/30208; G06T 2207/30244; G03B 43/00; G03B 43/02; G02B 7/003; G02B 7/004; G02B 7/005; G06K 9/00711
    USPC ....... 348/188, 180, 181, 182, 187, 189, 190, 348/191, 164, 137, 142, 49, 50, 46, 348/207.1, 231.99, 231.1, 241, 247, 523, 348/567, 714, 719, 723; 382/154, 181, 382/190, 199, 216, 275
    See application file for complete search history.

(56) References Cited

U.S. PATENT DOCUMENTS

| | | | |
|---|---|---|---|
| 6,527,395 | B1 | 3/2003 | Raskar |
| 8,106,968 | B1 | 1/2012 | Rudin et al. |
| 8,368,762 | B1 | 2/2013 | Chen |
| 8,619,144 | B1* | 12/2013 | Chang ............... G06T 7/80 348/180 |
| 9,319,666 | B1* | 4/2016 | Lisin ............... G06T 7/80 |
| 9,338,447 | B1 | 5/2016 | Crump et al. |
| 9,417,689 | B1* | 8/2016 | Ramaswamy ........... G06F 3/01 |
| 9,489,735 | B1 | 11/2016 | Reitmayr |
| 9,519,954 | B2 | 12/2016 | Schechtman |
| 9,672,623 | B2 | 6/2017 | Ghazizadeh |
| 9,892,514 | B2 | 2/2018 | Maguire |
| 10,453,218 | B2 | 10/2019 | Doganis |
| 2004/0066454 | A1 | 4/2004 | Otani |
| 2005/0261849 | A1 | 11/2005 | Kochi |
| 2005/0286759 | A1 | 12/2005 | Zitnick |
| 2006/0023066 | A1* | 2/2006 | Li .................... H04N 21/21805 348/159 |
| 2007/0106482 | A1 | 5/2007 | Zandifar |
| 2008/0285854 | A1 | 11/2008 | Kotake |
| 2008/0292131 | A1* | 11/2008 | Takemoto ............... G06T 7/80 382/100 |
| 2009/0091623 | A1 | 4/2009 | Krogstad |
| 2010/0201809 | A1 | 8/2010 | Oyama |
| 2010/0259624 | A1 | 10/2010 | Li |
| 2011/0090343 | A1 | 4/2011 | Alt |
| 2011/0292178 | A1 | 12/2011 | Goma |
| 2011/0292219 | A1* | 12/2011 | Chang ............... G06T 7/0018 348/182 |
| 2012/0050540 | A1 | 3/2012 | Witt |
| 2012/0069193 | A1* | 3/2012 | Ramegowda ........ H04N 17/002 348/164 |
| 2014/0354828 | A1 | 4/2014 | Rubinstein |
| 2014/0253738 | A1* | 9/2014 | Mullis ................. H04N 17/002 348/187 |
| 2014/0285676 | A1* | 9/2014 | Barreto ............... H04N 17/002 348/187 |
| 2015/0130951 | A1 | 5/2015 | Olson |
| 2017/0053405 | A1* | 2/2017 | Desai ................... G06T 7/0018 |
| 2017/0228864 | A1* | 8/2017 | Liu ...................... G06T 7/0018 |
| 2017/0242421 | A1 | 8/2017 | Ghazizadeh |
| 2017/0287166 | A1* | 10/2017 | Claveau ............... H04N 17/002 |
| 2017/0372492 | A1 | 12/2017 | Doganis et al. |

OTHER PUBLICATIONS

Datta, Ankur, et al., "Accurate Camera Calibration using Iterative Refinement of Control Points," 2009 IEEE 12th International Conference on Computer Vision Workshops, ICCV Workshops : Kyoto, Japan, Sep. 27-Oct. 4, 2009, Institute of Electrical and Electronics Engineers, Piscataway, NJ, Sep. 27, 2009 (Sep. 27, 2009), pp. 1201-1208, XP031664504, ISBN: 978-1-4244-4442-7.

Zhang, Z., "A Flexible New Technique for Camera Calibration," IEEE Transactions on Pattern Analysis and Machine Intelligence, vol. 22, No. 11, Nov. 1, 2000 (Nov. 1, 2000), p. 1330, XP055037019, USA ISSN: 0162-8828, DOI: 10.1109/34.888718.

\* cited by examiner

COMPUTER-IMPLEMENTED METHOD OF CALIBRATING A CAMERA

RELATED APPLICATION(S)

This application claims priority under 35 U.S.C. § 119 or 365 to Europe, Application No. 16305777.1, filed Jun. 28, 2016. The entire teachings of the above application(s) are incorporated herein by reference.

FIELD OF INVENTION

The invention relates to a computer-implemented method for calibrating a camera. More precisely, the invention relates to the "intrinsic" calibration of a digital camera, i.e. to the estimation of the parameters determining its optical response, including focal length(s), principal point and optionally distortion parameters.

BACKGROUND

The invention applies, for instance, to the field of Augmented Reality (AR), where 3D computer-generated images representing virtual objects are superposed on top of images captured by a video camera. To merge the virtual and the real images in the most realistic way, an accurate calibration of the video camera is required. Indeed, AR needs defining a virtual camera, which is used for rendering virtual 3D objects. This virtual camera must match as closely as possible the real camera used to capture the real world which is rendered in the background. Data provided by the manufacturer of the camera are usually insufficiently accurate to give satisfactory results, making it necessary to resort to calibration.

Camera calibration is all about accuracy. Without a well-calibrated camera, the rendered objects will not look as if they were real and the User Experience will be ruined.

SUMMARY

Augmented Reality is a particularly demanding application, but not the only one requiring accurate camera calibration. Other applications include, for instance, 3D volume reconstructions, in which case the camera is often a depth camera.

The invention is not limited to one or several specific applications; it may be useful whenever accurate calibration of a video camera is required.

The most widespread technique used to perform camera calibration is known as Zhang's algorithm and is described in the paper by Z. Zhang "A Flexible New Technique for Camera Calibration." IEEE Transactions on Pattern Analysis and Machine Intelligence. Vol. 22, No. 11, 2000, pp. 1330-1334).

To calibrate a camera using this technique, a user must:

1. Print a calibration pattern (typically a regular array of black and white elements), using a laser printer;
2. Measure the printed pattern to ensure its size has not been scaled by the printer;
3. Glue the pattern on a rigid surface such as rigid cardboard, a piece of wood or, even better, glass, ensuring that the pattern remains straight (e.g. by checking that there are no air bubbles between the paper and the pattern);
4. Position the pattern in front of the camera and move it around to change its orientation and position;
5. Capture images corresponding to several different positions and orientations ("poses") of the pattern; and
6. Process the images according to a mathematical algorithm described in detail in the above-referenced paper.

The processing step, by itself, can be easily carried out using existing software. Manufacturing the calibration pattern may be tedious, but it is not particularly difficult. Indeed, the most difficult and time consuming part of the calibration process is constituted by steps 4 and 5, i.e. positioning the pattern and acquiring a suitable set of images thereof. Indeed, it is very difficult to take many different pictures of a pattern while respecting a good image distribution: too few images will lead to an incorrect, or at least not accurate, camera calibration, and too many images of similar poses can lead to biases in the estimation of the parameters. Moreover, there is a risk that a significant fraction of the images turns out to be non-exploitable by the calibration algorithm, for instance because part of the pattern is not visible, reducing the size of the calibration set. Therefore, the general recommendation is to take as many pictures as possible, in the hope that that errors and biases will be averaged out in the process. Also, the calibration lacks repeatability: two users calibrating a same camera (or a same user calibrating it twice) will use different sets of poses, and therefore find slightly different calibration parameters.

Document U.S. Pat. No. 8,106,968 also describes a method of calibrating a camera by detecting distortions in a plurality of images of a pattern.

Without any guidance by an experienced person, a novice user will very often end up with an inaccurate camera calibration, wasting time and feeling frustrated.

Also, it is difficult for a person to perform the calibration alone. Most often, at least two people are required: one person keeps the pattern in front of the camera, in the required pose, and the other one triggers the acquisition of an image, e.g. by pressing a key. A person trying to perform both tasks at once would probably end up moving the pattern haphazardly when triggering the image acquisition.

The invention aims at solving these drawbacks of the prior art. It achieves this aim by providing a camera calibration "wizard"—i.e. a software assistant—which guides the user through the complex camera calibration process. Instead of making the user take as many pictures of as many poses as possible and then reject those which are considered invalid or redundant, the invention provides the user with a predetermined set of required poses, materialized by target areas successively displayed on a computer screen. Visual feedback, provided through the screen, helps the user to align the physical calibration pattern to the displayed target areas; the software detects when the calibration pattern is correctly aligned to the currently displayed target area before acquiring an image thereof, and then displaying the following target area. Once all the predetermined target areas, associated to respective poses, have been displayed and the corresponding pattern images have been acquired, the calibration algorithm (step 6) may be run like in the prior art—but with the guarantee of using a suitable (usually optimal or near-optimal) calibration set. Calibration proper may be performed using Zhang's algorithm or any other suitable method.

The invention simplifies and accelerates the calibration process, while improving its quality, reliability and repeatability:

By maintaining full control of the calibration poses and procedure, it guarantees that the poses will be distinct and the pattern will be well detected for each of them. In turn, this may ensure that the calibration results are reliable and the calibration quality predictable.

The user knows in advance how many steps are left before the end of the procedure, avoiding frustration.

Image acquisition is triggered automatically when the pattern is in the right position (it fits the target area), allowing the calibration to be performed by a single user, with minimal risk of error.

As the poses are predetermined and suggested by the computer system performing the calibration, the user needs not have any particular expertise, and the accuracy of the calibration is largely user-independent.

The number of poses may be quite low, e.g. between 10 and 20—the inventor has found empirically that 11 suitably-chosen poses allow calibrating the focal length of the camera with a 0.01° accuracy. As a consequence, the whole pose acquisition process may only take a few minutes.

An object of the present invention is then a computer-implemented method of calibrating a camera, comprising the steps of:

a. acquiring a video stream from said camera, and displaying it on a screen;

b. displaying on the screen, superimposed to the video stream, a representation of a target area;

c. detecting a calibration pattern in the video stream and periodically check whether it fits within the target area;

d. when the calibration pattern is found to fit within the target area, extracting an image thereof from the video stream and storing it;

said steps a. to d. being iterated a plurality of times using respective target areas, different from each other and corresponding to different positions of a physical support carrying the calibration pattern within a field of view of the camera; and then e. estimating intrinsic calibration parameters of the camera by processing the stored images.

According to particular embodiments of the invention:

Said step c. may comprise checking whether the calibration pattern fills at least a predetermined fraction of the target area.

Said step c. may comprise detecting at least one edge of the calibration pattern and checking its parallelism with a corresponding edge of the target area.

Said step c. may comprise detecting at least two edges of the calibration pattern, measuring an angle between said edges and comparing it with an angle between two corresponding edges of the target area.

Said step c. may comprise detecting at least one corner of the calibration pattern and checking its proximity to a corresponding corner of the target area.

The method may further comprise a step c' of displaying on the screen at least one graphical pattern indicating at least one of: a distance between a point of the calibration pattern and a corresponding point of the target area; a direction of a translation required to make a point of the calibration pattern coincide with a corresponding point of the target area; and a correspondence between geometrical elements of the calibration pattern and of the target area.

Steps a. to d. may be iterated a number of times comprised between 10 and 20, using respective target areas corresponding to different positions of said physical support.

At least a majority of said positions of the physical support may be neither perpendicular nor parallel to an optical axis of the camera.

Said calibration pattern may be a planar pattern.

Said step e. may be carried out using Zhang's algorithm.

Another object of the invention is a computer program product, stored on a computer-readable data-storage medium, comprising computer-executable instructions to cause a computer system interfaced to a camera to carry out such a method.

Another object of the invention is a computer-readable data-storage medium containing computer-executable instructions to cause a computer system interfaced to a camera to carry out such a method.

Yet another object of the invention is a computer system comprising a processor coupled to a memory, a screen and a camera, the memory storing computer-executable instructions to cause the computer system to calibrate the camera by carrying out such a method.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Additional features and advantages of the present invention will become apparent from the subsequent description, taken in conjunction with the accompanying drawings, which show.

DETAILED DESCRIPTION

A description of example embodiments follows.

Figure 1:
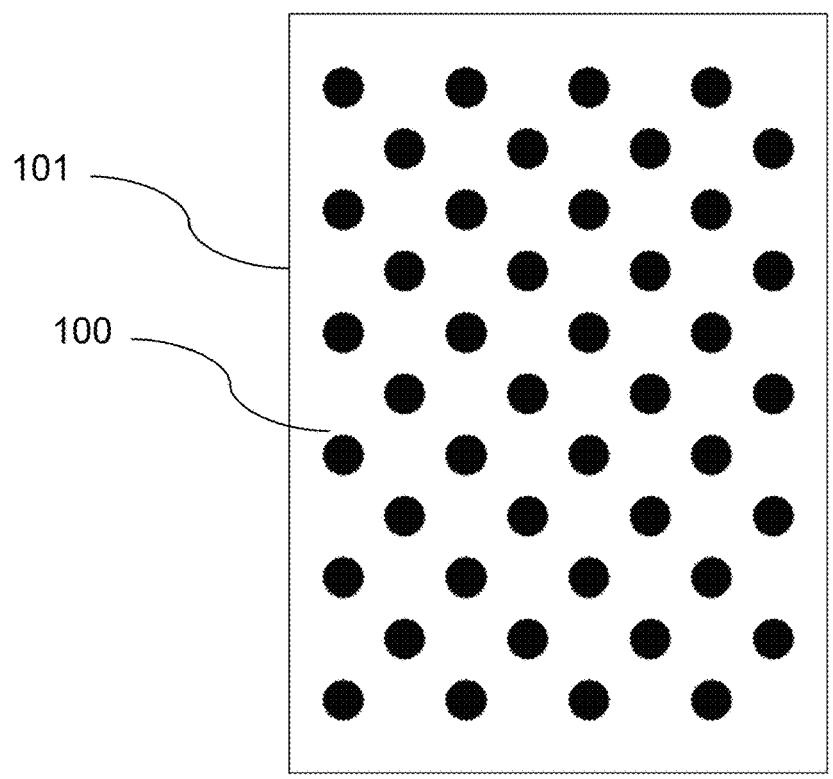
FIG. 1, a calibration pattern known from the prior art.

FIG. 1 shows a calibration pattern 100 formed by a regular array of black disks on a white background. Other patterns may be used for carrying out the invention, for instance chessboards or grids, but this one turns out to be particularly advantageous as it provides the best accuracy with a minimal number of poses, see A. Datta et al. "Accurate Camera Calibration using Iterative Refinement of Control Points" IEEE 12th International Conference on Computer Vision Workshops (ICCV Workshops), 2009. This pattern is carried by a physical support 101 which may e.g. be a rigid cardboard panel. A three-dimensional (i.e. intentionally non-planar) calibration pattern may also be used, but is not recommended. "Active" calibration patterns, comprising e.g. blinking light sources, may also be used.

Figure 2:
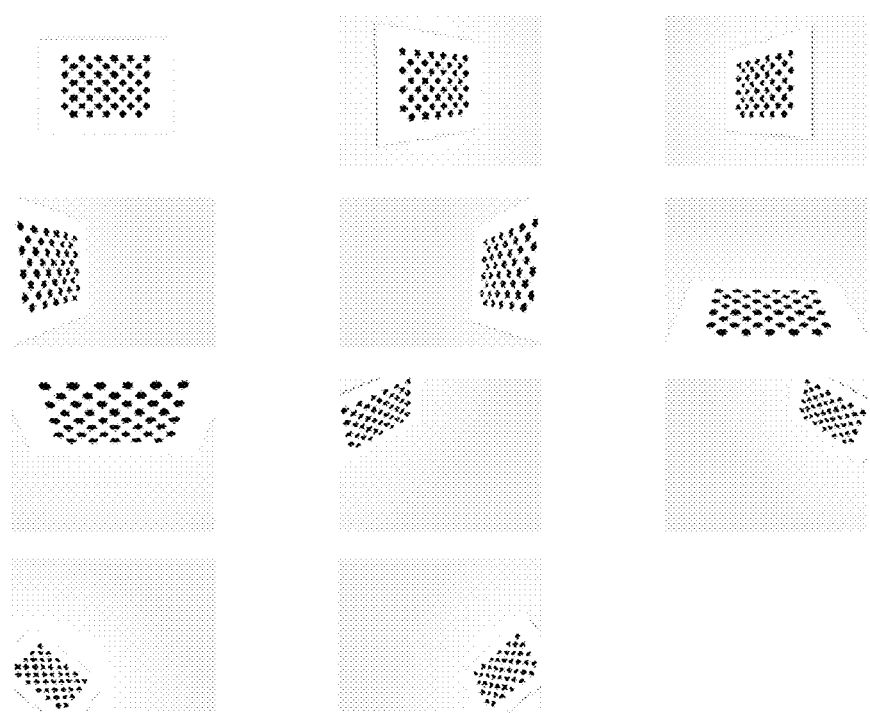
FIG. 2, a set of 11 poses of the calibration pattern of FIG. 1 used in a calibration method according to an embodiment of the invention.

As explained above, the inventive computer program leads the user to place the calibration pattern in several different poses within the field of view of the camera to be calibrated. FIG. 2 shows a set of 11 poses for the pattern of FIG. 1, which allows performing the calibration quickly yet accurately. The first pose (albeit the order is not important) corresponds to the pattern facing the camera, at the center of the field of view, the plane of the pattern being perpendicular to the focal axis of the camera (otherwise stated, the pattern lies in the focal plane, or in a plane parallel and near to it). The second and third poses are obtained by inclining the pattern toward the left and toward the right, respectively, while keeping it near the center of the field of view. The fourth (fifth) pose is similar to the second (third) one, but the pattern is turned more, and also shifted toward the right (left) of the visual field. The sixth (seventh) pose is obtained by turning the pattern upwardly (downwardly) and shifting it toward the bottom (top) of the visual field. In the eighth, ninth, tenth and eleventh pose, the pattern is shifted toward the corners of the—supposedly rectangular—field of view, and tilted toward its center. All but the first pose induce a perspective, as the pattern is not parallel to the focal plane; the first pose, without perspective, is useful for estimating lens distortions.

Other sets of poses may be used without departing from the scope of the invention. Advantageously, a set may comprise no less than 10 (to ensure accuracy) and no more than 20 (to avoid an excessive duration of the process) poses, all different from each other.

Figure 3:
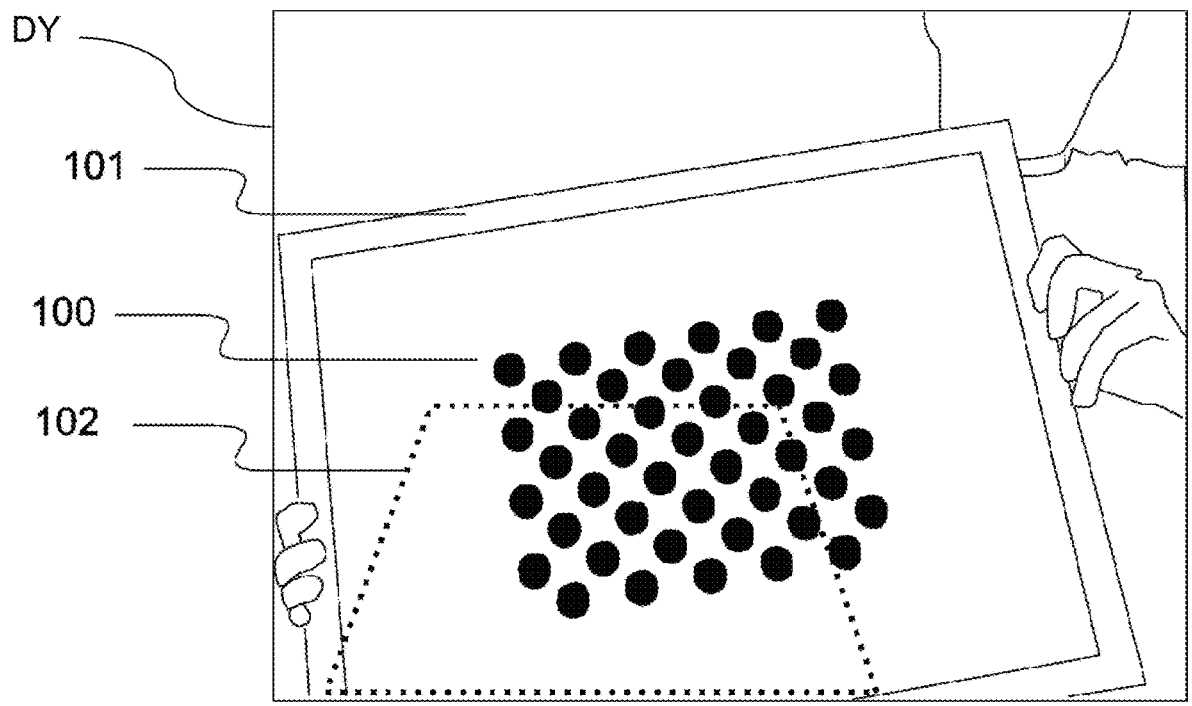
FIG. 3, a computer screen displaying a scene acquired by a camera to be calibrated, showing a user holding a calibration pattern according to FIG. 1 in front of the camera and, superimposed to this scene, a target area.

According to the invention, the user positions him/herself in front of the camera, holding the physical support 101 carrying the calibration pattern 100. The camera is connected to a computer, and placed near to (or on top of, or even integrated with) a screen—also called a monitor, or a display—of this computer. The camera acquires a series of images of a scene including the physical support 101 and therefore the calibration pattern 100, and converts them to a digital video stream. Then, the computer acquires the video stream from the camera and drives the screen to display said video stream; therefore the user sees himself, and the calibration pattern, like in a mirror. The screen also displays, superimposed to the video stream from the camera, a geometric shape 102 generated by the computer and representing a target area for the calibration pattern. More precisely, this geometric shape may correspond to the outline of the calibration pattern as seen by the camera when it is positioned according to one of the poses of the set of FIG. 2. This is illustrated on FIG. 3. In this exemplary embodiment, the target area 102 is represented by a dashed outline, but other representations are possible; for instance, the target area may be a semi-transparent representation of the target pattern.

Figure 4:
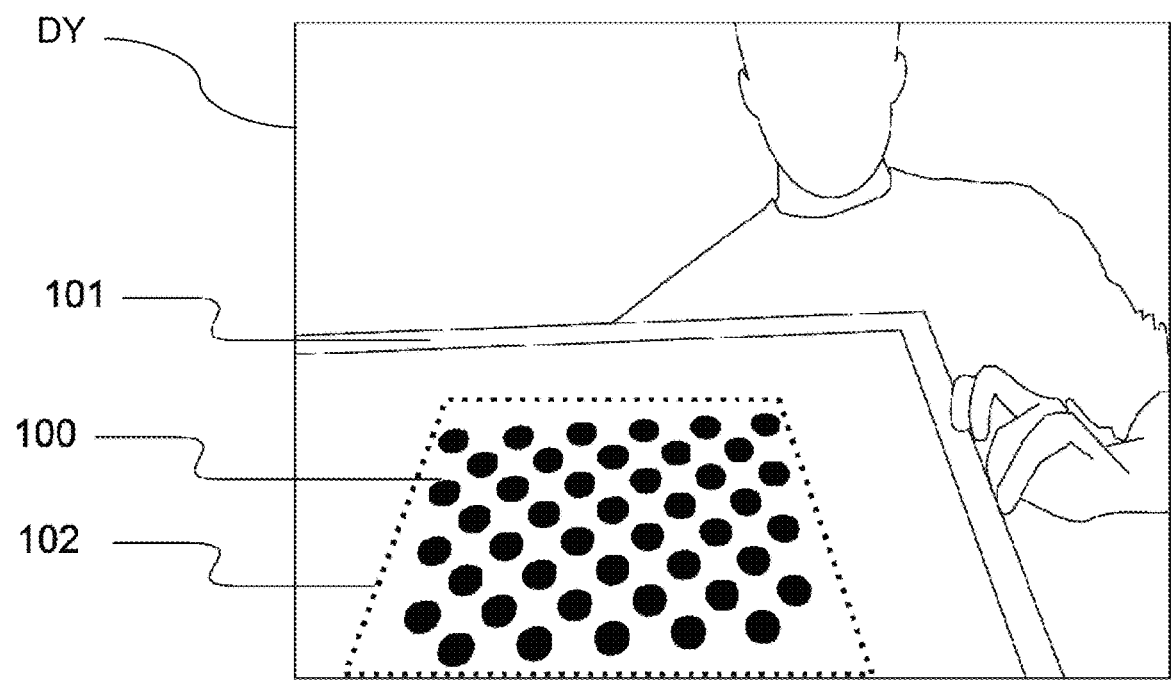
FIG. 4, the computer screen of FIG. 3, displaying a similar scene but wherein the calibration pattern has been moved to fit the target area.
Figure 5:
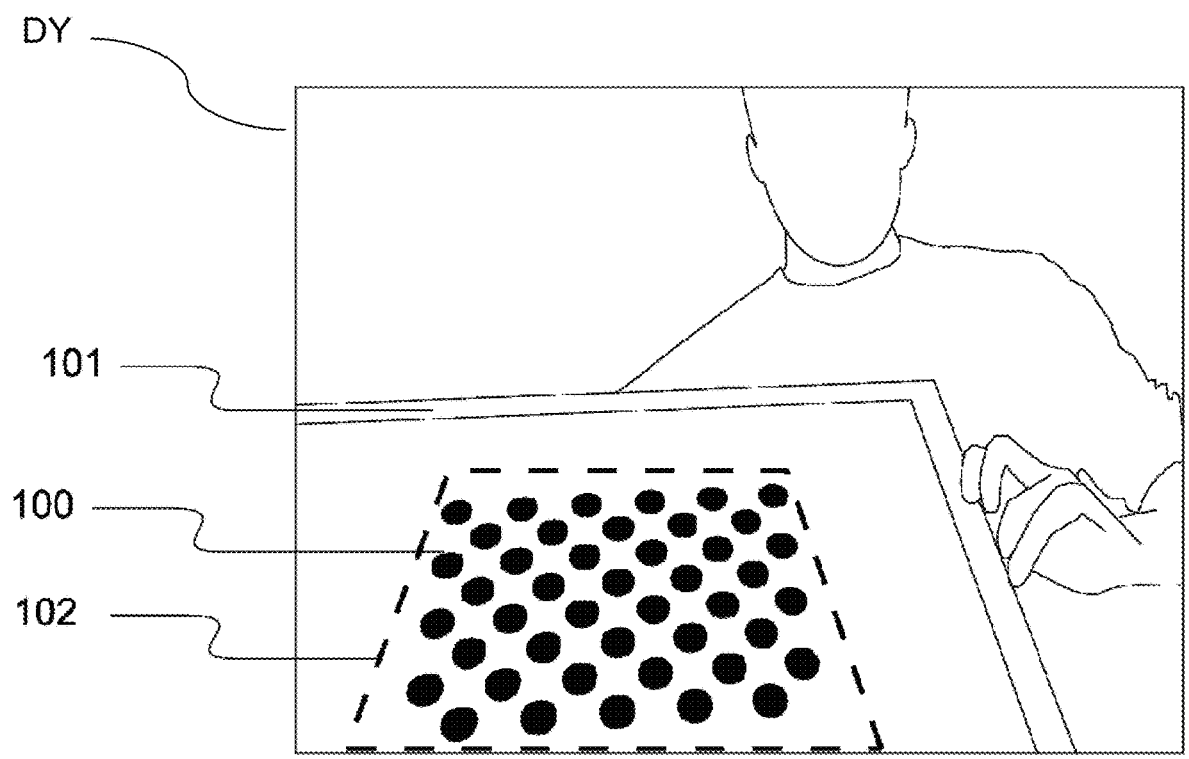
FIG. 5, the computer screen of FIGS. 3 and 4, displaying a similar scene but wherein the appearance of the target area has changed to inform the user that a calibration image has been acquired.

The user moves the calibration pattern trying to make its image, displayed by the computer screen, to fit the target area (see FIG. 4). During this time, the computer processes the video stream to detect the pattern—using well known image processing algorithms—and determine whether it does fit the target area. If it does, the computer extracts an image of the pattern from the video stream and stores it into its memory, it provides a visual feedback to the user to inform him of the image acquisition (on the example of FIG. 5, the appearance of the outline of the target area 102 is changed) and starts displaying the target area corresponding to the following pose of the set (unless the image acquisition process is over). Already-used target areas may remain displayed with a semi-transparent appearance, so that the user "sees" the progress which is being made.

Alternatively, it may be more convenient for the user to hold and move the camera around a static pattern instead of moving the pattern. This is typically the case when the camera to calibrate is on the rear side of a tablet computer or a smartphone.

Determining that the calibration pattern properly fits the target area may be carried out using known algorithms. For instance, the computer may check that the pattern (or, rather, its image acquired by the camera) fills at least a predetermined minimal fraction of the surface of the target area, say 75%. Alternatively or additionally, the computer may check the parallelism between corresponding edges of the calibration pattern and of the target area. Considering that the pattern is most often seen in perspective, it may also be useful to measure the angle between two consecutive edges thereof and comparing it with a corresponding angle of the target area. The computer may also check if the corners of the calibration pattern are close enough to those of the target area. A more accurate but less flexible approach consists in calculating where each feature of the pattern should be projected inside the target area, and comparing these projected features with the actually detected ones.

Figure 6:
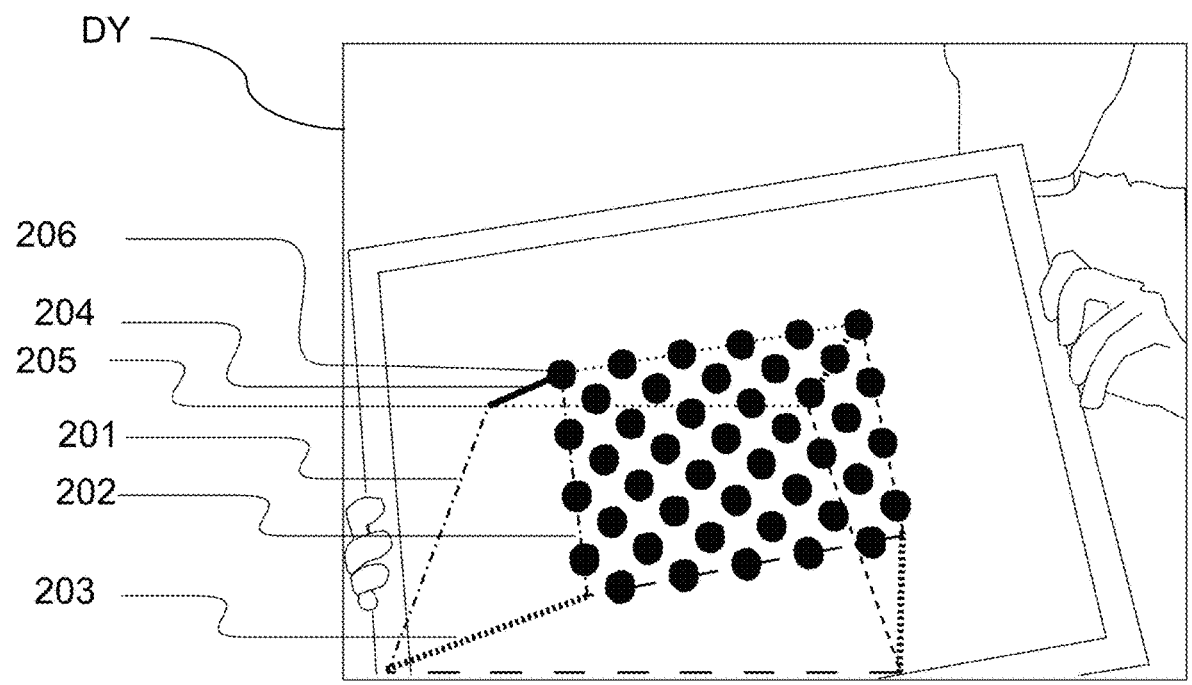
FIG. 6, the computer screen of FIGS. 3 to 5, displaying the same scene as FIG. 3 to which a set of graphical patterns has been superposed for assisting the user in the positioning of the calibration pattern has been.

According to particular embodiments of the invention, the computer may generate, and display on the screen, graphical patterns helping the user to align the calibration pattern to the target area. Some of these patterns are illustrated on FIG. 6. On this figure, the four sides 201 of the target may have different appearances (in an actual implementation, they may have different colors). Corresponding sides 202 of the calibration pattern are identified and displayed with a similar appearance (the same color). The computer may also draw lines 203, 204 connecting corners 205 of the target area to corresponding corners 206 of the calibration pattern. The direction of these lines indicates the direction of the translation required to make the two corners coincide; the appearance of the line may be indicative of the distance between the corresponding corners (compare lines 203 and 204). More generally the graphical pattern may be indicative, inter alia, of:

the distance between a point of the calibration pattern and a corresponding point of the target area;
the direction of the translation required to make a point of the calibration pattern coincide with a corresponding point of the target area; and
a correspondence between geometrical elements of the calibration pattern and of the target area.

Figure 7:
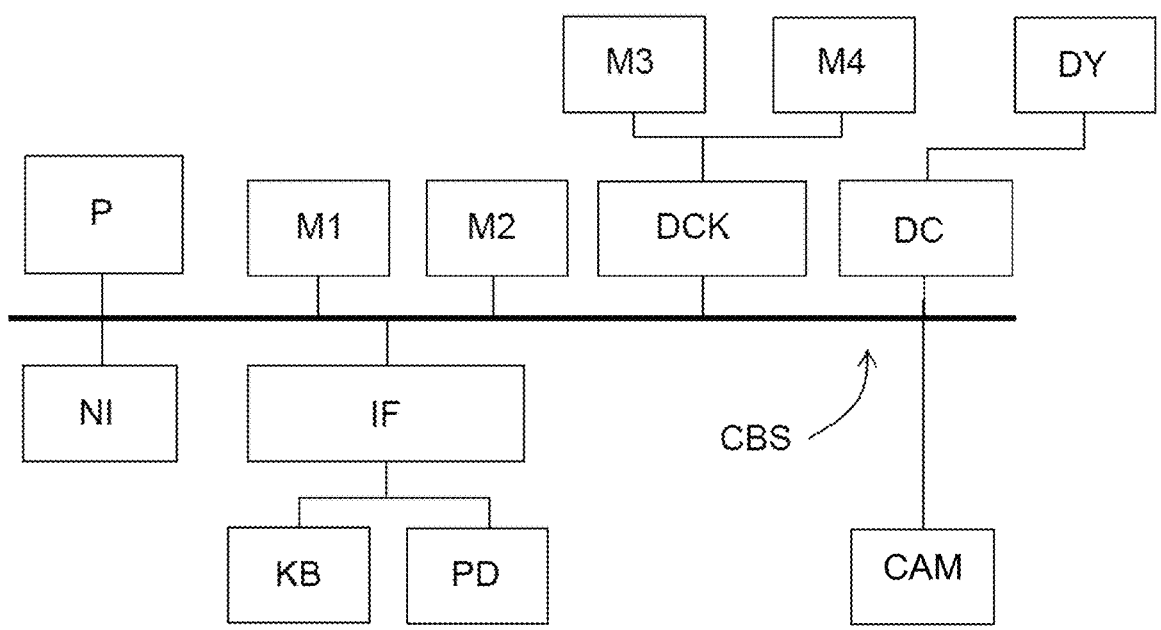
FIG. 7, a block diagram of a computer system suitable for carrying out a method according to an embodiment of the invention.

A computer suitable for carrying out a method according to an exemplary embodiment of the present invention is described with reference to FIG. 7. In FIG. 7, the computer includes a Central Processing Unit (CPU) P which performs the processes described above. The process can be stored as an executable program, i.e. a set of computer-readable instructions in memory, such as RAM M1 or ROM M2, or on hard disk drive (HDD) M3, DVD/CD drive M4, or can be stored remotely. At least one reference image of calibration pattern (of FIG. 1) and a set of target areas 102 corresponding to different, predetermined poses of the calibration pattern (of FIG. 2) are stored on one or more of memory devices M1 to M4, or remotely.

The claimed invention is not limited by the form of the computer-readable media on which the computer-readable instructions and/or the calibration pattern(s) and the set of target areas are stored. For example, the instructions, the trial sets of calibration parameters and the digital model(s) can be stored on CDs, DVDs, in FLASH memory, RAM, ROM, PROM, EPROM, EEPROM, hard disk or any other information processing device with which the computer aided design station communicates, such as a server or computer. The program, the calibration pattern(s) and the set of target areas can be stored on a same memory device or on different memory devices.

Further, a computer program suitable for carrying out the inventive method can be provided as a utility application, background daemon, or component of an operating system, or combination thereof, executing in conjunction with CPU 800 and an operating system such as Microsoft VISTA, Microsoft Windows 7, UNIX, Solaris, LINUX, Apple MAC-OS and other systems known to those skilled in the art.

CPU P can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer aided design station in FIG. 7 also includes a network interface NI, such as an Intel Ethernet PRO network interface card from Intel Corporation of America, for interfacing with a network, such as a local area network (LAN), wide area network (WAN), the Internet and the like. The computer aided design station further includes a display controller DC, such as a NVIDIA GeForce GTX graphics adaptor from NVIDIA Corporation of America for interfacing with screen or display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface. All these components are connected to each other through communication bus CBS, which can be an ISA, EISA, VESA, PCI, or similar. Moreover, the camera CAM to be calibrated is also connected to the bus CBS, in order to provide a video stream to the CPU P, which processes it as explained above.

A description of the general features and functionality of the display, keyboard, pointing device, as well as the display controller, disk controller, network interface and I/O interface is omitted herein for brevity as these features are known.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of calibrating a camera, comprising the steps of:
   a. acquiring a video stream from said camera, and displaying it on a screen;
   b. displaying on the screen, superimposed to the video stream, a representation of a given target area from among a predetermined set of target areas;
   c. detecting a calibration pattern in the video stream and periodically checking whether it fits within the given target area;
   d. when the calibration pattern is found to fit within the given target area, extracting an image thereof from the video stream and storing it;
   said steps a. to d. being iterated a plurality of times using respective target areas from the predetermined set of target areas, different from each other, each target area corresponding to an outline of the calibration pattern as seen by the camera when a physical support carrying the calibration pattern takes a respective position within a field of view of the camera; and then
   e. estimating intrinsic calibration parameters of the camera by processing the stored images.

2. The computer-implemented method of claim 1, wherein said step c. comprises checking whether the calibration pattern fills at least a predetermined fraction of the given target area.

3. The computer-implemented method of claim 1, wherein said step c. comprises detecting at least one edge of the calibration pattern and checking its parallelism with a corresponding edge of the given target area.

4. The computer-implemented method of claim 1, wherein said step c. comprises detecting at least two edges of the calibration pattern, measuring an angle between said edges and comparing it with an angle between two corresponding edges of the given target area.

5. The computer-implemented method of claim 1, wherein said step c. comprises detecting at least one corner of the calibration pattern and checking its proximity to a corresponding corner of the given target area.

6. The computer-implemented method of claim 1, further comprising a step c' of displaying on the screen at least one graphical pattern (203, 2011) indicating at least one of:
   a distance between a point of the calibration pattern and a corresponding point of the given target area;
   a direction of a translation required to make a point of the calibration pattern coincide with a corresponding point of the given target area; and
   a correspondence between geometrical elements of the calibration pattern and of the given target area.

7. The computer-implemented method of claim 1 wherein steps a. to d. are iterated a number of times comprised between 10 and 20, using respective target areas corresponding to different positions of said physical support.

8. The computer-implemented method of claim 1 wherein at least a majority of said positions of the physical support are neither perpendicular nor parallel to an optical axis of the camera.

9. The computer-implemented method of claim 1 wherein said calibration pattern is a planar pattern.

10. The computer-implemented method of claim 1 wherein said step e. is carried out using Zhang's algorithm.

11. A computer program product, stored on a non-transitory computer-readable data-storage medium, comprising:
    an interface to a camera, the interface formed of computer-executable instructions that cause a computer system interfaced to the camera to:
    a. acquire a video stream from said camera, and display it on a display screen;
    b. display on the screen, superimposed to the video stream, a representation of a given target area from among a predetermined set of target areas;
    c. detect a calibration pattern in the video stream and periodically check whether it fits within the given target area;
    d. when the calibration pattern is found to fit within the given target area, extract an image thereof from the video stream and store it;

said steps a. to d. being iterated a plurality of times using respective target areas from the predetermined set of target areas, different from each other, each target area corresponding to an outline of the calibration pattern as seen by the camera when a physical support carrying the calibration pattern takes a respective position within a field of view of the camera; and then e. estimate intrinsic calibration parameters of the camera by processing the stored images.

12. A non-transitory computer-readable data-storage medium comprising:

computer-executable instructions embodying camera calibration including computer-executable instructions that cause a computer system interfaced to a camera to:

a. acquire a video stream from said camera, and display it on a display screen;

b. display on the screen, superimposed to the video stream, a representation of a given target area from among a predetermined set of target areas;

c. detect a calibration pattern in the video stream and periodically check whether it fits within the given target area;

d. when the calibration pattern is found to fit within the given target area, extract an image thereof from the video stream and store it in memory;

said steps a. to d. being iterated a plurality of times using respective target areas from the predetermined set of target areas, different from each other, each target area corresponding to an outline of the calibration pattern as seen by the camera when a physical support carrying the calibration pattern takes a respective position within a field of view of the camera; and then e. estimate intrinsic calibration parameters of the camera by processing the stored images.

13. A computer system comprising:
   a processor coupled to a memory;
   a display screen; and
   a camera,
   the memory storing computer-executable instructions that cause the computer system to calibrate the camera by:

a. acquiring a video stream from said camera, and displaying it on a display screen;

b. displaying on the screen, superimposed to the video stream, a representation of a given target area from among a predetermined set of target areas;

c. detecting a calibration pattern in the video stream and periodically checking whether it fits within the given target area;

d. when the calibration pattern is found to fit within the given target area, extracting an image thereof from the video stream and storing it;

said steps a. to d. being iterated a plurality of times using respective target areas from the predetermined set of target areas, different from each other, each target area corresponding to an outline of the calibration pattern as seen by the camera when a physical support carrying the calibration pattern takes a respective position within a field of view of the camera; and then e. estimating intrinsic calibration parameters of the camera by processing the stored images.

14. The computer system of claim 13 wherein said detecting comprises checking whether the calibration pattern fills at least a predetermined fraction of the given target area.

15. The computer system of claim 13 wherein said detecting comprises detecting at least one edge of the calibration pattern and checking its parallelism with a corresponding edge of the given target area.

16. The computer system of claim 13 wherein said detecting comprises detecting at least two edges of the calibration pattern, measuring an angle between said edges and comparing it with an angle between two corresponding edges of the given target area.

17. The computer system of claim 13 wherein said detecting comprises detecting at least one corner of the calibration pattern and checking its proximity to a corresponding corner of the given target area.

18. The computer system of claim 13 further comprising a step c' of displaying on the screen at least one graphical pattern indicating at least one of:
   a distance between a point of the calibration pattern and a corresponding point of the given target area;
   a direction of a translation required to make a point of the calibration pattern coincide with a corresponding point of the given target area; and
   a correspondence between geometrical elements of the calibration pattern and of the given target area.

19. The computer system of claim 13 wherein said calibration pattern is a planar pattern.

20. The computer system of claim 13 wherein said estimating is carried out using Zhang's algorithm.

* * * * *

UNITED STATES PATENT AND TRADEMARK OFFICE
CERTIFICATE OF CORRECTION

PATENT NO. : 10,510,162 B2
APPLICATION NO. : 15/601619
DATED : December 17, 2019
INVENTOR(S) : Fivos Doganis Page 1 of 1

It is certified that error appears in the above-identified patent and that said Letters Patent is hereby corrected as shown below:

In the Claims

In Claim 6, Column 8, at Line 32, delete "pattern (203, 2011) indicating" and insert -- pattern indicating --.

Signed and Sealed this
Eighteenth Day of February, 2020

Andrei Iancu
*Director of the United States Patent and Trademark Office*